United States Patent [19]

Karlsson et al.

[11] Patent Number: 4,639,731

[45] Date of Patent: Jan. 27, 1987

[54] MONOPULSE FEEDER FOR TRANSMITTING AND RECEIVING RADAR SIGNALS WITHIN TWO MUTUALLY SEPARATED FREQUENCY BANDS

[75] Inventors: Göran R. Karlsson, Älvängen; John H. S. Karnevi, Gothenburg, both of Sweden

[73] Assignee: Telefonaktiebolaget LM Ericsson, Stockholm, Sweden

[21] Appl. No.: 645,447

[22] Filed: Aug. 29, 1984

[30] Foreign Application Priority Data

Sep. 14, 1983 [SE] Sweden ................................ 8304937

[51] Int. Cl.⁴ ................................................ G01S 13/44

[52] U.S. Cl. ........................................ 342/147; 342/5

[58] Field of Search ................... 343/786, 779, 781 R, 343/16 M

[56] References Cited

U.S. PATENT DOCUMENTS 4,468,670 8/1984 Suzuki et al. ........................ 343/779

*Primary Examiner*—Stephen C. Buczinski
*Assistant Examiner*—Donald E. Hayes, Jr.
*Attorney, Agent, or Firm*—Roberts, Spiecens & Cohen

[57] ABSTRACT

A monopulse feeder for transmission and/or reception of two separate frequency bands, the X and Ka bands, comprises a mouth section (8) and a wave guide section (9) connected to comparator circuits (5 and 6, respectively) for each frequency band. The mouth section is formed with two rectangular pairs of openings (81*a*, 81*b* and 82*a*, 82*b*, respectively) of which one (82*a*, 82*b*) is of smaller dimensions than the other (81*a*, 81*b*), and is placed between the openings of the second pair (81*a*, 81*b*). The feeder is placed at the inner focal point of a two-band Cassegrain reflector system.

3 Claims, 13 Drawing Figures

A-A

B-B

C-C

MONOPULSE FEEDER FOR TRANSMITTING AND RECEIVING RADAR SIGNALS WITHIN TWO MUTUALLY SEPARATED FREQUENCY BANDS

TECHNICAL FIELD

The present invention relates to a monopulse feeder for transmission and reception of radar signals and which is incorporated in a Cassegrain reflector system, for example. The invention affords, together with the reflector system, a monopulse antenna which can be used for two widely separated frequency bands, e.g. the 9 GHz X-band and the 35 GHz Ka-band, with a common feeder location. Since the radiation appears to come from the same point for both frequency bands, the antenna lobe directions also coincide.

BACKGROUND ART

Building radar aerials or antennas for transmission/-reception of radar signals within two separate frequency bands is already known.

(a) In a known embodiment of the radar aerial two entirely separate aerial elements are arranged for both frequency bands.

(b) In another known embodiment, two separate feeder systems for the two frequency bands are arranged, these systems having a common reflector system and being placed in the vicinity of each other (c) In a further embodiment, two feeder systems are used for different frequency bands located at two different focal points in a Cassegrain aerial system, which will be described in detail in conjunction with FIG. 1 on the accompanying drawing.

The disadvantage with the embodiment according to (a) is that the antenna system requires at least twice as much space as when only one frequency band were to be transmitted or received.

The disadvantage with the embodiment according to (b) is that lobe directions are obtained which do not coincide for both frequency bands. Furthermore, both the feeders cannot be placed in focus, and one or both must be defocused, which results in somewhat deteriorated performance.

In the embodiment according to (c) the greatest disadvantage is that one of the feeders (usually the one for the higher frequency) must be placed in the outer focal point. Thus the depth of the aerial increases considerably, at the same time as the feeder, its support and supply lines decrease the radiation surface of the aerial. There are also losses from the long lines to the feeder.

DISCLOSURE OF THE INVENTION

The present invention entirely or partially eliminates the above-mentioned disadvantages, by giving a single feeder unit an implementation such that radar signals within both frequency bands can be transmitted or received by the unit.

An object of the invention is thus to provide a monopulse feeder included in an aerial reflector system, and which is a combination of two feeders for both frequency bands, where the feeder for the higher frequency band is placed inside the feeder for the lower frequency band.

BRIEF DESCRIPTION OF DRAWINGS

The invention will now be described in detail with reference to the appended drawings, whereon.

BEST MODES FOR CARRYING OUT THE INVENTION

A known feeder system according to FIGS. 1–5 will be briefly discussed before the monopulse feeder according to the invention is described further.

Figure 1:
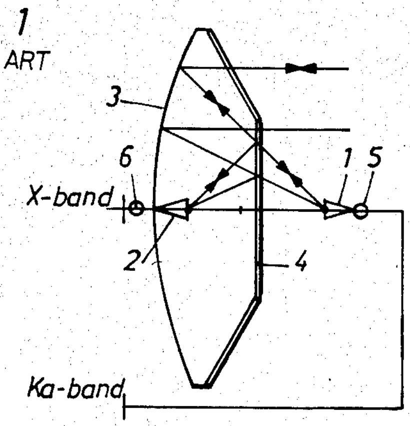
Fig. 1 PRIOR ART
FIG. 1 illustrates an aerial system of a known kind according to (c) above.

A Cassegrain aerial system with two feeders 1 and 2 placed at a given distance from each other is illustrated in FIG. 1. The feeder 1 is of smaller dimensions than the feeder 2, and is used for transmission/reception of signals within the Ka-band, while the feeder 2 is used for signals within the X-band. The feeder 1 is located at the focal point of a parabolic reflector 3 and is connected to comparator circuits 5 for conventionally forming sum and difference signals in the vertical and horizontal planes.

The feeder 2 is placed at one of the focal points of a hyperbolic refelector 4, the second focal point of which coincides with the focal point of the parabolic reflector 3. The feeder 2 is connected to comparator circuit 6.

The feeder 1 is vertically polarized and the feeder 2 is horisontally polarized. Furthermore, the parabolic reflector 3 has 90° polarization rotation on the X-band and the hyperbolic reflector 4 is reflecting for horizontal polarization and transparent for vertical polarization. There is thus obtained a division of the incoming radar signals for the different frequency bands on reception. The received signals are converted and adapted for connecting to four wave conductors. The signals in these are taken to one or more of the above mentioned comparator circuits in a monopulse packet where sum and difference signals in the vertical and horizontal are formed.

Figure 2:
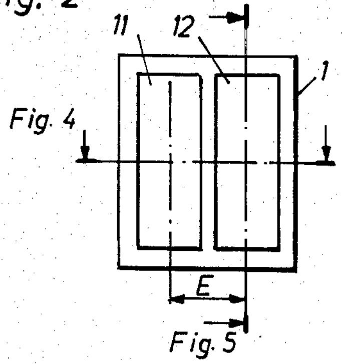
FIGS. 2–5 illustrate more closely the appearance of the feeder included in the system according to FIG. 1.
Figure 5:
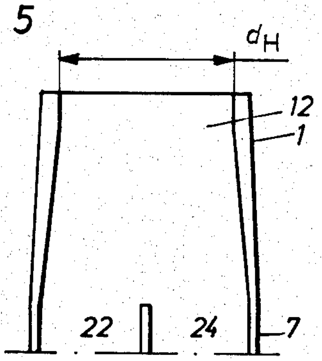

In a view from the front, FIG. 2 more fully illustrates the mouth of the known feeder 1 with two wave conductor openings 11, 12 in a longitudinal section. FIG. 5 illustrates in a longitudinal section the adapting section of the feeder according to FIG. 1, where one opening 12 merges into two wave conductors 22, 24.

Figure 3:
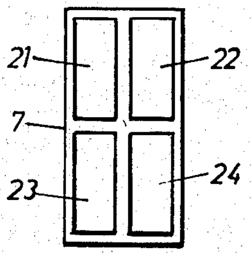

FIG. 3 is a cross section of the wave conductor section 7, from which it appears that both mouth openings 11, 12 merge into four wave conductors 21, 23 and 22, 24, respectively.

Figure 4:
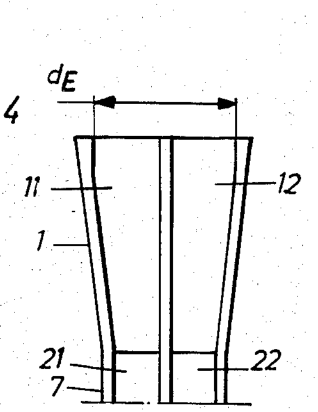

Finally, FIG. 4 is a longitudinal section of the monopulse feeder along the adapting section in a longitudinal section at right angles to the longitudinal section of FIG. 5.

The feeder opening dimensions are substantially determined by the wave length and opening angle according to the equation $$d=(k\cdot\lambda)/\text{Sin}\ \phi$$

where $\lambda$=wave length, $\phi$=half the opening angle,, k is 0.8 for $d=d_E$ (the E plane) and k is 1.0 for $d=d_H$ (the H plane), see also FIGS. 4 and 5. The opening dimensions of the feeder are thus inversely proportional to the frequency.

Figure 6:
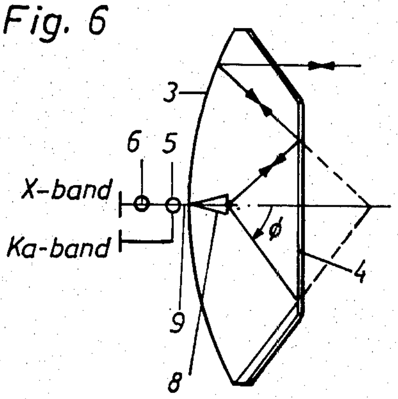
FIG. 6 illustrates an aerial system similar to the one in FIG. 2, containing a feeder in accordance with the invention.

The combined feeder in accordance with the present invention may be placed, for example, at the inner focal point of a two-band Cassegrain reflector system and may be used for both frequency bands (the Ka and X band). FIG. 6 illustrates such a system with a monopulse feeder 8 in accordance with the invention. The feeder 8 connected via a wave conductor section 9 to the comparator circuit for each frequency band. The comparator circuits 5 for the higher frequency band are placed between the wave conductors of the lower frequency band, the conductors being connected to comparator circuits 6. The designations of the reflectors in the aerial system are the same as in FIG. 1. Half the opening angle of the feeder for both frequency bands is denoted by $\phi$.

Figure 7:
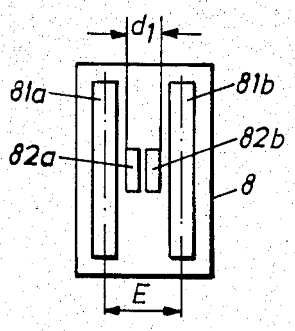
FIGS. 7–8 more closely illustrate the appearance of the feeder in accordance with the present invention.

In a view from the front, FIG. 7 illustrates the mouth portion of the monopulse feeder in accordance with the invention. In this case it has two rectangular feeder openings 81*a* and 81*b* for the lower frequency. The dimension E is the same here as in FIG. 2. Compared with the openings in the known feeder according to FIG. 2, the feeder openings 81*a*, 81*b* have a narrower dimension in the E plane to make room for two further openings 82*a*, 82*b* for the higher frequency. Since the dimension E is to be unaltered so that the same opening angle $2\phi$ (as in FIG. 2) shall be retained, (the same aerial reflector shapes shall be retained) a limit is set for how much room which can be created for the opening pair 82*a*, 82*b*. Furthermore, the width of the openings 82*a*, 82*b* cannot be too small, with regard to matching and power resistance. According to the above, the dimension $d_1$ is inversely proportional to the frequency of the radar signal. In practice, thus, the upper frequency band must be at least 3–4 times as high as the lower frequency band to obtain good operation with both bands. With reduced data the quotient can be reduced to about 2.

Figure 8:
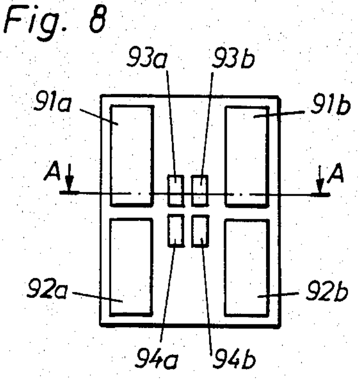

FIG. 8 illustrates in detail the cross-section of the wave guides section of the feeder according to the invention. The wave conductors with the openings 91*a*, 91*b*, 92*a*, 92*b* are the feeder wave guides for the lower frequency band (X-band), and guide the wave-guiding modes coming in on reception and which are formed in the feeder openings 81*a*, 81*b* in FIG. 7. The wave guides with the openings 93*a*, 93*b*, 94*a*, 94*b* are the feeder wave guides for the higher frequency band and guide the modes coming in on reception, and which are formed at the feeder openings 82*a*, 82*b* in FIG. 7.

Figure 9:
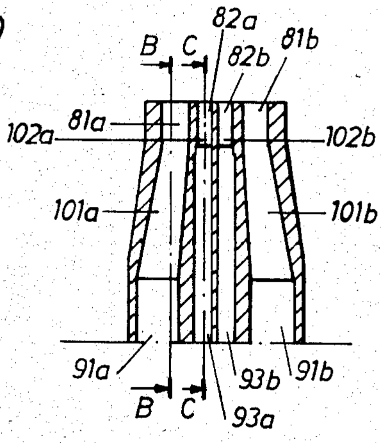

The feeder in accordance with the invention is illustrated in FIG. 9 along the section A—A in FIG. 8. The upper part of the feeder in FIG. 9 is the feeder opening itself, and the dimensions of the wave guides, which are shown in cross section, correspond to the width of the openings 81*a*, *b* and 82*a*, *b* in FIG. 7. The lower part of the feeder is the wave guide section and its dimensions correspond to those according to FIG. 8. There is an adaption section 101*a*, *b* and 102*a*, *b* between the feeder section and the wave guide section for dividing up the feeder openings 81*a* and 81*b* into four wave guides 91*a*, 92*a* and 92*a*, 91*b* in the wave guide section. In a similar way, the feeder openings 82*a* and 82*b* are divided up in the adapter section into the four wave guides 93*a*, 94*a* and 94*a*, 93*b* (FIG. 8).

Figure 10:
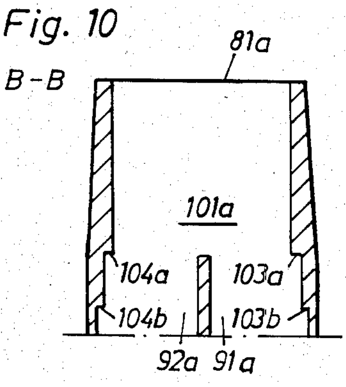
Figure 11:
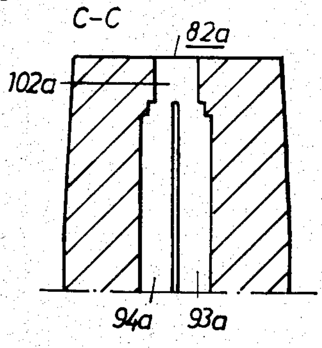

FIG. 10 illustrates the feeder as seen in the longitudinal section B—B of FIG. 9. The wave guide wall 105 separates both wave guides 91*a*, 92*a* of FIG. 8. In the wave guide section there are adaption steps 103*a*, 103*b* and 104*a*, 104*b* disposed on the inner surface of the outer wave guide wall. FIG. 11 illustrates in section C—C of FIG. 9 the corresponding adapter section for the higher frequency band wave guides 93*a*, *b* and 94*a*, *b*. The cross-sectional dimensions of the respective wave guide section (i.e. 91*a*, *b*, 92*a*, *b* and 93*a*, *b*, 94*a*, *b*) are suitably standard dimensions for direct connection to outer wave guides and to respective comparator circuits. The feeder must be tuned for electrical adaption of the feeder ports. This can be done conventionally with the aid of capacitive and inductive means in the adapter section.

Figure 12:
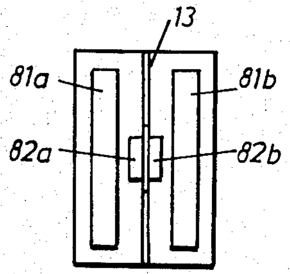
FIGS. 12 and 13 illustrate an adaption of the feeder according to FIG. 7.
Figure 13:
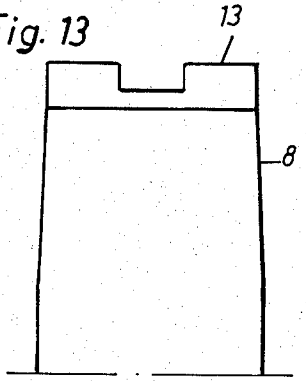

Adjustment and adaption of radiation data can be carried out with the aid of a plate 13, illustrated in FIGS. 12 and 13, between both the minor openings 82*a*, 82*b* along the longitudinal line of symmerty on the upper surface of the feeder section. The flange or plate 13 primarily has the task of preventing radiation to, or from, one of the openings 81*a*, *b*, 82*a*, *b* from spreading to adjacent openings.

By integration of both feeders of a two-band monopulse feeder into a single feeder placed at the inner focal point in the aerial reflector system, no exterior feeder is required, resulting, inter alia, in that the depth of the aerial is not increased. The supply lines to the integrated feeder can be made short with lower line losses as a result. Furthermore, coinciding lobe directions are obtained with the inventive feeder.

We claim:

1. A two frequency band monopulse radar antenna system comprising: a two-band Cassegrain reflector array having a parabolic reflector with a focal point and a hyperbolic reflector having a first focal point coinciding with the focal point of said parabolic reflector and a second focal point; and monopulse feeder means positioned at the second focal point of said hyperbolic reflector and being adapted to be connected to a first transmission means for a first radar band and to a second transmission means for a second radar band; said monopulse feeder means having

- a mouth section including a first pair of openings (81*a*, 81*b*) with the same cross-sectional dimensions, and a second pair of openings (82*a*, 82*b*) with the same cross-sectional dimensions, all of said openings being in the same plane,
- a wave guide section having one end for connection to said transmission means and another end, first and second pairs of waveguides and third and forth pairs of wave guides for connecting said ends, said one end including a first (91*a*, 91*b*) and a second (92*a*, 92*b*) pair of openings for providing communication of said first and second pairs of wave guides with the first transmission means, and said one end further including a third (93*a*, 93*b*) and a fourth (94*a*, 94*b*) pair of openings for providing for communication of said third and fourth pairs of waveguides with the second transmission means, and
- a matching section connecting said mouth section to the other end of said wave guide section, said matching section including a first wave guide means for merging the first pair of wave guides of said wave guide section into a single wave guide connected to one of the openings of said first pair of openings of said mouth section, a second wave guide means for merging the second pair of wave guides of said wave guide section into a single wave guide connected to the other opening of said first pair of openings of said mouth section, a third wave guide means for merging the third pair of wave guides of said waveguide sections with a single wave guide connected to one of the openings of said second pair of openings of said mouth section and a forth wave guide means for merging the forth pair of wave guides of said wave guide section into a single wave guide connected to the other opening of said second pair of openings of said mouth section 2. The antenna system of claim 1 wherein the openings of said first pair of openings of said mouth section are elongated and disposed along first mutually displaced parallel planes, and the openings of said second pair of openings of said mouth section are elongated and disposed along second mutually displaced parallel planes lying within said first mutually displaced parallel planes.

3. The antenna system of claim 2 wherein the cross section of said pairs of openings of said mouth section are rectangular.

* * * * *